United States Patent Office 3,268,572
Patented August 23, 1966

3,268,572
SEPARATION OF AZEOTROPIC ALCOHOL-ESTER MIXTURES
Fritz Knörr and Hellmuth Spes, Burghausen, Upper Bavaria, Germany, assignors to Wacker-Chemie G.m.b.H., Munich, Germany
No Drawing. Filed Sept. 6, 1962, Ser. No. 221,860
Claims priority, application Germany, Mar. 26, 1960, W 27,540; Sept. 8, 1961, W 30,670
5 Claims. (Cl. 260—462)

This application is a continuation-in-part of application Serial No. 96,686, filed March 20, 1961, and now abandoned.

The present invention relates to an improved process for the separation of mixtures of alcohols and esters which form azeotropic mixtures.

Azeotropic mixtures of alchols and esters which cannot be separated by simple distillation often occur in technology and various proposals have already been made as to how to separate such azeotropic mixtures. One known process consists in separating such mixtures into their components by extraction. The separation achieved, however, is incomplete and more or less large quantities of the components remain dissolved in the other phase. In addition, the separated materials are obtained in very dilute form.

According to other processes the relative volatility of the components of the azeotropic mixture is so altered by the addition of a further component tthat a distillative separation becomes possible. Such processes, however, have the drawback that additional energy is required for the distillation of the added component.

It is an object of the present invention to provide an improved process for the separation of alcohol-ester containing azeotropic mixtures in which, if desired, one or more of the components may be in excess.

The process according to the invention is characterized in that the alcohol of the alcohol-ester mixture is converted into an acetal in a known manner with an aldehyde in the presence of an acid catalyst. The water of reaction or the acetal produced during the acetalization is removed distillatively and the reaction mixture separated by distillation. The components can be separated from each other almost completely in good yields without requiring the use of an additional distillative assistant to permit distilling off of one of the components azeotropically.

The process according to the invention is particularly applicable to the separation of mixtures of esters with alcohols containing up to 8 carbon atoms. The term "alcohol" as used herein includes aromatic alcohols, that is, phenols, as well as aliphatic alcohols. When methanol is concerned and the acetal produced is the low boiling methylal the latter is first separated off distilatively. In the case of higher alcohols the water produced in the acetal formation is first distilled off azeotropically.

The azeotropic removal of the water produced in the acetal formation is rendered possible in that acetals and usually also the ester components form azeotropic mixtures with water from which water separates in a separate layer upon cooling. For this reason, the use of a distillation assistant for the azeotropic removal of the water is generally completely unnecessary. However, in some instances, the addition of an entraining agent for water can be advantageous, for example, when the boiling points of the individual components are not favorable.

It is not necessary that the composition of the alcohol-ester containing mixtures exactly correspond to the azeotropic proportions. Either the alcohol or the ester component can be present in excess. As a consequence, a preliminary distillation to remove the excess component to provide the azeotropic mixture can often be completely omitted.

The selection of the aldehyde employed for the acetalization depends upon the boiling point, as well as the possible utility of the acetal produced. In general, it is preferable to select an aldehyde R—CHO (R=H or lower alkyl) whose acetal has a sufficiently different boiling point from one of the other components to simplify the distillative separation. In many instances formaldehyde will be suited as the aldehyde. Formaldehyde can be especially advantageously used in the form of its polymers which are easily depolymerized to formaldehyde, such as, paraformaldehyde. The quantity of aldehyde used in most instances will be stoichiometric. In individual instances, however, a slight excess or deficiency may be used.

As catalysts, all of the acid compounds or esters usable for acetal formation are suited in the usual concentrations. For example, the following are illustrative: hydrochloric acid, sulfuric acid, calcium chloride, p-toluene sulfonic acid, cation exchange agents, aluminum chloride, zinc chloride, pyridine hydrochloride, sodium bisulfate, iron chloride, ortho silicic acid ester, titanic acid ester, dimethyl sulfite and others. After completion of the acetalization the catalyst can, if necessary, be neutralized, for example, with soda, sodium acetate, organic bases and the like. This can be of special advantage if unsaturated esters are to be purified without causing polymerization worth mentioning.

The process can be carried out discontinuously or continuously. In discontinuous operation, the alcohol-ester mixture to be separated is mixed with the calculated quantity of aldehyde required for the acetalization of the alcohol contained therein, the catalyst and if necessary a polymerization inhibitor and heated in an apparatus provided with a column to distill off the acetal or water, whichever be the lower boiling reaction product, in the measure it is produced. Thereafter the remaining components of the reaction mixture can also be separated by distillation. As indicated above, when alcohols higher than methanol are concerned the water is first distilled off azeotropically rather than the acetal and in this instance the head of the distillation column is provided with a separator for the water in the azeotropic mixture distilled off and a conduit for returning the organic layer of the azeotropic mixture to the column. When the separation of the water has ended, which usually occurs in about 2–3 hours, the ester and the acetal produced are separated by fractional distillation, if necessary after neutralization of the catalyst. When methanol is concerned and methylal is the acetal produced the ester may either be distilled off with the methylal or be retained with the water depending upon the boiling point of the ester concerned. The ester can then be separated either from the methylal or from the water by suitable fractional distillation.

If the process is to be carried out continuously, the alcohol-ester containing mixture to be separated can, for example, be introduced together with the aldehyde into an acetalizing column (provided at its head with an arrangement for separating the water produced when higher alcohol containing mixtures are concerned) and whose filling consists of a cation exchange agent. In this instance no catalyst is contained in the reaction mixture itself. It is also possible, however, to supply the catalyst with the reaction mixture and in this instance no catalyst is contained in the filling of the column. The reaction mixture which runs continuously out of the sump of the column or which distills off at the head of the column when methanol and a low boiling ester are concerned can then be separated into its components by continuous distillation. Depending upon the boiling points of the components, the process can be carried out at normal, reduced or raised pressures and preferably at pressures between 10 and 760 mm. Hg.

The process according to the invention is of special advantage in the production of acrylic or α-alkyl acrylic acid esters from acetals and ketenes over β-alkoxy-carboxylic acid esters as the intermediate step. The mixture of acrylic or α-alkyl acrylic acid esters and alcohols obtained upon cleavage of the β-alkoxy-carboxylic acid esters is subjected to the separation process according to the invention. The acetal formed can then be recycled and reacted with ketene. It is possible in this way to obtain the desired esters in pure form and free from alcohol without an additional distillation assistant and without formation of undesired by-products.

The following examples will serve to illustrate several embodiments of the process according to the invention.

Example 1

375 g. of azeotropic mixture consisting of 60% of propyl acetate and 40% of n-propanol (2.5 mols) were mixed with 40.3 g. of 93% paraformaldehyde (1.25 mols) and 2.0 g. of p-toluene sulfonic acid. The reaction mixture was heated and the water produced distilled off azeotropically over a column, the upper organic layer being returned to the column. After the water of reaction (25.2 g.) was removed, the p-toluene sulfonic acid was neutralized with 1 g. of sodium acetate and the reaction mixture fractionally distilled.

222 g. of propyl acetate corresponding to a 98.6% yield upon the ester supplied were obtained. Of these, 190 g. were practically pure propyl acetate. In addition, 152 g. of formaldehyde di-n-propyl acetal (1.15 mols) and 10.5 g. of propanol were obtained. This corresponds to a total yield of 99.1% based on the propanol and a 92.1% yield based on formaldehyde.

Example 2

200 g. of an azeotropic mixture consisting of 48% of propyl acetate and 52% of allyl alcohol (1.79 mols) were mixed with 29 g. of 93% paraformaldehyde (0.9 mol) and 1 g. of p-toluene sulfonic acid. The reaction mixture was heated and the water produced distilled off azeotropically over a column, the upper organic layer being returned to the column. After the water of reaction (17.4 g.) was removed, the p-toluene sulfonic acid was neutralized with 0.5 g. of sodium acetate and the reaction mixture fractionally distilled.

94.8 g. of propyl acetate corresponding to a 98% yield upon the ester supplied were obtained. Of these, 84.8 g. were practically pure propyl acetate. In addition, 106.8 g. of formaldehyde di-allyl acetal (0.833 mol) and 5.7 g. allyl alcohol were obtained. This corresponds to a total yield of 98.0% based on the allyl alcohol and a 92.5% yield based on formaldehyde.

Example 3

1400 g. of an azeotropic mixture consisting of 15% of acrylic acid butyl ester and 85% of butanol (16.1 mols) were mixed with 259 g. of 93% paraformaldehyde (8.04 mols), 3.5 g. p-toluene sulfonic acid and 2.0 g. of hydroquinone. The reaction mixture was heated and the water produced distilled off azeotropically over a column, the upper organic layer being returned to the column. After the water of reaction (148.2 g.) was removed, the p-toluene sulfonic acid was neutralized with 1.8 g. of sodium acetate and the reaction mixture fractionally distilled under vacuum.

208.5 g. of acrylic acid butyl ester corresponding to a 99.2% yield upon the ester supplied were obtained. Of these, 188 g. were practically pure acrylic acid butyl ester. In addition, 1183 g. of formaldehyde-di-n-butyl acetal (7.4 mols) and 84.5 g. of butanol were obtained. This corresponds to a total yield of 99.1% based on the butanol and 92% based on formaldehyde.

Example 4

448 g. of an acrylic acid-n-hexyl ester-n-hexanol mixture consisting of 8.93% of acrylic acid-n-hexyl ester and 91.07% of n-hexanol (4.0 mols; the azeotropic mixture contains about 10% of acrylic acid-n-hexyl ester and 90% n-hexanol) were mixed with 64.5 g. of 93% paraformaldehyde (2.0 mol), 2.5 g. of p-toluene sulfonic acid and 2.5 g. of hydroquinone. The reaction mixture was heated and the water produced distilled off azeotropically over a column under vacuum, the upper organic layer being returned to the column. After the water of reaction (40.0 g.) was removed, the p-toluene sulfonic acid was neutralized with 1.3 g. of sodium acetate and the reaction mixture fractionally distilled under vacuum.

39.6 g. of acrylic acid-n-hexyl ester corresponding to a 99.1% yield upon the ester supplied were obtained. Of these, 33.4 g. were practically pure acrylic acid-n-hexyl ester. In addition, 404 g. of formaldehyde-di-n-hexyl acetal (1.87 mols) and 25.0 g. of n-hexanol were obtained. This corresponds to a total yield of 99.5% based on the n-hexanol and a 93.4% yield based on formaldehyde.

Example 5

Acrylic acid-(2-ethyl)-butyl ester and 2-ethyl-butanol formed an azeotropic mixture with an ester content of less than 20%.

448 g. of a mixture consisting of 8.93% of acrylic acid-(2-ethyl)-butyl ester and 91.07% of 2-ethyl butanol (4 mols) were mixed with 64.5 g. of 93% paraformaldehyde (2 mols), 2.5 g. of p-toluene sulfonic acid and 2.5 g. of hydroquinone. The reaction mixture was heated and the water produced distilled off azeotropically over a column under a vacuum of 60 to 20 mm. Hg, the upper organic layer being returned to the column. After the water of reaction (40.5 g.) was removed, the p-toluene sulfonic acid was neutralized with 1.3 g. of sodium acetate and the reaction mixture fractionally distilled under vacuum.

39.3 g. of acrylic acid-(2-ethyl)-butyl ester corresponding to a 98.3% yield upon the ester supplied were obtained. Of these, 32 g. were practically pure acrylic acid-(2-ethyl)-butyl ester. In addition, 400 g. of formaldehyde-di-(2-ethyl)-butyl acetal (1.85 mols) and 22.9 g. of 2-ethyl-butanol were obtained. This corresponds to a total yield of 99.1% based on the 2-ethyl-butanol and a 92.5% yield based on formaldehyde.

Example 6

Acrylic acid-(2-ethyl)-hexyl ester and 2-ethyl-hexanol form an azeotropic mixture with an ester content of less than 15%.

500 g. of a mixture consisting of 20% of acrylic acid-(2-ethyl)-hexyl ester and 80% of 2-ethyl hexanol (3.08 mols) were mixed with 50 g. of 93% paraformaldehyde (1.55 mols), 2.5 g. of p-toluene sulfonic acid and 2.5 g. of hydroquinone. The reaction mixture was heated and the water produced distilled off azeotropically over a column under a vacuum of 60 to 20 mm. Hg, the upper organic layer being returned to the column. After the water of reaction (29.7 g.) was removed, the p-toluene sulfonic acid was neutralized with 1.3 g. of sodium acetate and the reaction mixture fractionally distilled under vacuum.

99.1 g. of acrylic acid-(2-ethyl)-hexyl ester corresponding to a 99.1% yield upon the ester supplied were obtained. Of course, 88 g. were practically pure acrylic acid-(2-ethyl)-hexyl ester. In addition, 388 g. of formaldehyde-di-(2-ethyl)-hexyl acetal (1.43 mols) and 29.2 g. of 2-ethyl-hexanol were obtained. This corresponds to a total yield of 99.1% based on the 2-ethyl-hexanol and 91.8% based on formaldehyde.

Example 7

Methacrylic acid butyl ester and butanol form an azeotropic mixture.

500 g. of a mixture consisting of 20% of methacrylic acid butyl ester and 80% of butanol (5.4 mols) were mixed with 87 g. of 93% paraformaldehyde (2.7 mols), 2.5 g. of p-toluene sulfonic acid and 2.5 g. of hydroquinone. The reaction mixture was heated and the water produced distilled off azeotropically over a colum under a vacuum of 50 to 40 mm. Hg, the upper organic layer being returned to the column. After the water of reaction (53.5 g.) was removed, the p-toluene sulfonic acid was neutralized with 1.3 g. of sodium acetate and the reaction mixture fractionally distilled under vacuum.

98.7 g. of methacrylic acid butyl ester corresponding to a 98.7% yield upon the ester supplied were obtained. Of these, 85.6 g. were practically pure methacrylic acid butyl ester. In addition, 397 g. of formaldehyde-di-butyl acetal (2.48 mols) and 27.6 g. of butanol were obtained. This corresponds to a total yield of 98.9% based on the butanol and a 92% yield based on formaldehyde.

Example 8

200 g. of an azeotropic mixture consisting of 87% of phenyl acetate and 13% of o-chlorophenol (0.2 mol) were mixed with 3.3 g. of 93% paraformaldehyde (0.1 mole) and 1 g. of p-toluene sulfonic acid. The reaction mixture was heated and the water produced distilled off azeotropically over a column under vacuum, the organic layer being returned to the column. After the water of reaction (2.1 g.) was removed, the p-toluene sulfonic acid was neutralized with 0.5 g. of sodium acetate and the reaction mixture fractionally distilled under vacuum.

171 g. of phenyl acetate corresponding to a 98.2% yield upon the ester supplied were obtained. Of these, 165 g. were practically pure phenyl acetate. In addition, 25.8 g. of formaldehyde-di-o-chlorophenol acetal (0.95 mol) were obtained as a residue remaining in the flask, as well as 1.07 g. of o-chlorophenol were obtained. This corresponds to a total yield of 98.9% based on the o-chlorophenol and a 94.8% yield based on formaldehyde.

Example 9

208 g. of an azeotropic mixture consisting of 48% of benzyl formate and 52% of benzyl alcohol (1 mol) were mixed with 16.2 g. of 93% paraformaldehyde (0.5 mol) and 1 g. of p-toluene sulfonic acid. The reaction mixture was heated and the water produced distilled off azeotropically over a column under vacuum, the upper organic layer being returned to the column. After the water of reaction (10.2 g.) was removed, the p-toluene sulfonic acid was neutralized with 0.5 g. of sodium acetate and the reaction mixture fractionally distilled under vacuum.

99.2 g. of benzyl formate corresponding to a 99.2% yield upon the ester supplied were obtained. Of these, 87.7 g. were practically pure benzyl formate. In addition, 111 g. of formaldehyde-di-benzyl-acetal (0.486 mol) and 1 g. of benzyl alcohol were obtained. This corresponds to a total yield of 98.2% based on the benzyl alcohol and a 97.2% yield based on formaldehyde.

Example 10

200 g. of an azeotropic mixture consisting of 76% of glycol diacetate and 24% of glycol (0.774 mol) were mixed with 77.5 g. of diethyl acetaldehyde (0.775 mol) and 1.2 g. p-toluene sulfonic acid. The reaction mixture was heated and the water produced distilled off azeotropically over a column, the upper organic layer being returned to the column. After the water of reaction (13.6 g.) was removed, the p-toluene sulfonic acid was neutralized with 0.6 g. of sodium acetate and the reaction mixture fractionally distilled first at normal pressure and then under vacuum.

150 g. of glycol diacetate corresponding to a 98.6% yield upon the ester supplied were obtained. Of these, 135 g. were practically pure glycol diacetate. In addition, 108 g. of diethyl acetaldehyde ethylene acetal (0.75 mol) and 0.96 g. of glycol were obtained. This corresponds to a total yield of 98.8% based on the glycol and 96.8% based on the diethyl acetaldehyde.

Example 11

200 g. of an azeotropic mixture consisting of 37% of diethyl carbonate and 63% of butanol (1.7 mols) were mixed with 27.5 g. of 93% paraformaldehyde (0.85 mol) and 1 g. of phosphoric acid. The reaction mixture was heated and the water produced distilled off azeotropically over a column, the upper organic layer being returned to the column. After the water of reaction (16.6 g.) was removed, the phosphoric acid was neutralized with 2.5 g. of sodium acetate and the reaction mixture fractionally distilled.

72.6 g. of diethyl carbonate corresponding to a 98.2% yield upon the ester supplied were obtained. Of these, 57 g. were practically pure diethyl carbonate. In addition, 125 g. of formaldehyde-di-butyl acetal (0.78 mol) and 9.0 g. of butanol were obtained. This corresponds to a total yield of 98.9% based on the butanol and a 91.8% yield based on formaldehyde.

Example 12

500 g. of an azeotropic mixture of 71% butyl bromide and 29% of n-propanol (2.42 mols) were mixed with 39 g. of 93% paraformaldehyde (1.21 mols) and 2.7 g. of p-toluene sulfonic acid. The reaction mixture was heated and the water produced distilled off azeotropically over a column, the organic layer being returned to the column. After the water of reaction (24.5 g.) was removed, the p-toluene sulfonic acid was neutralized with 1.4 g. of sodium acetate and the reaction mixture fractionally distilled.

350 g. of butyl bromide corresponding to a 98.6% yield of the amount supplied were obtained. Of these, 324 g. were obtained as practically pure butyl bromide. In addition, 149 g. of formaldehyde-di-n-propyl acetal (1.13 mol) and 8.1 g. of n-propanol were obtained. This corresponds to a total yield of 98.9% based on the n-propanol and a 93.3% yield based on formaldehyde.

Example 13

860 g. of azeotropic mixture consisting of 19.5% of methanol and 80.5% of methylacetate were mixed with 80.6 g. of 93% paraformaldehyde and 12 g. concentrated $H_2SO_4$ and heated in a vessel provided with a distillation column. Within 4 hours 200 g. of distillate having a boiling point up to 42° C. and a 92% methylal content were drawn off over the column. Thereafter the $H_2SO_4$ was neutralized with sodium acetate and the residual mixture distilled further, after intermediate runnings had distilled over a short period of time 656 g. of practically pure methylacetate distilled over. The intermediate runnings were recycled to a further batch. The total methylal yield was 189 g. corresponding to 99.5% of the theoretical. The total methylacetate yield was 672 g. corresponding to 97.2% of that supplied.

Example 14

384 g. of a methanol-methylacetate mixture (1:1 by weight) and 247 g. of a 36.4% formalin solution were subjected per hour to a column 3.5 m. high and 35 mm. in diameter and containing a cation exchanger, the mixture being supplied 50 cm. above the lower end of the column and the formalin being supplied 80 cm. below the upper end of the column. The sump of the column was heated so that the continuous run off from the sump practically only contained water. 435 g. per hour of a distillate containing 50.6% methylal, 43.6% methylacetate, 4.6% methanol and 1.2% of water were obtained, from which pure methylacetate was recovered by simple distillation after separating off the methanol containing methylal. The yields were practically quantitative.

Example 15

Analogously to Example 4, 400 g. of a mixture consisting of 68% of acrylic acid methyl ester, 6% of water, 2% dimethyl ether and 24% of methanol, as well as 115.5 g. of a 36.4% formalin solution in admixture with 10 g. of phosphoric acid were supplied per hour to the column. 405 g. of head product were obtained per hour which upon distillation, after a first running of methylal which entrains the unconverted methanol in the form of an azeotropic mixture, and after short intermediate runnings and removal of the water in the form of a hetero-azeotropic mixture with acrylic acid methyl ester, yielded pure acrylic acid methyl ester. 92% of the acrylic acid methyl ester supplied were recovered, of this 90% was in the form of the pure polymerizable acrylic acid methyl ester.

Example 16

A mixture of 32 g. of methanol and 68 g. of trimethylborate with 14.5 g. 93% paraformaldehyde was heated in the presence of 2 g. of p-toluene sulfonic acid analogously to Example 13. 35.3 g. of 92% methylal were obtained on first runnings and after the intermediate runnings had distilled over for a short period of time, 60 g. of practically methanol free trimethylborate distilled over. The yields were almost quantitative.

We claim:

1. In a process for separating mixtures of alcohols of 1–8 carbon atoms with esters which form azeotropic mixtures with such alcohols, the steps which comprise acetalizing the alcohol in such mixtures with an aldehyde of the formula R—CHO in which R is selected from the group consisting of hydrogen and lower alkyl in the presence of an acid acetalizing catalyst at a pressure between 10 and 760 mm. Hg while distillatively separating one of the reaction products of the acetalization selected from the group consisting of the acetal and the water produced and separating the ester from the remaining reaction product of the acetalization.

2. In a process for separating mixtures of alcohols of 2–8 carbon atoms with esters which form azeotropic mixtures with such alcohols, the steps which comprise acetalizing the alcohol in such mixtures with formaldehyde in the presence of an acid acetalizing catalyst at a pressure between 10 and 760 mm. Hg while azeotropically distilling off the water produced and distilling the acetal containing reaction mixtures to separate the components thereof.

3. The process of claim 2 comprising in addition neutralizing the catalyst before distilling the acetal containing reaction mixtures.

4. In a process for separating mixtures of methanol with esters which form azeotropic mixtures with methanol, the steps which comprise acetalizing the methanol with formaldehyde in the presence of an acid acetalizing catalyst at a pressure between 10 and 760 mm. Hg while distillatively separating the methylal produced and recovering the ester from the mixture obtained by distillation.

5. In a process for separating mixtures of methanol with esters which form azeotropic mixtures with methanol, the steps which comprise acetalizing the methanol with formaldehyde in the presence of an acid acetalizing catalyst at a pressure between 10 and 760 mm. Hg while distillatively removing the methylal produced from the reaction mixture, neutralizing the catalyst and recovering the ester from the neutralized mixture obtained by distillation.

References Cited by the Examiner

UNITED STATES PATENTS

| | | | |
|---|---|---|---|
| 1,850,836 | 3/1932 | Guinot | 260—615 |
| 2,307,937 | 1/1943 | Marvel | 260—615 |
| 2,719,180 | 9/1955 | Rottig | 260—643 |

CHARLES B. PARKER, *Primary Examiner.*

REYNOLD J. FINNEGAN, DELBERT R. PHILLIPS, *Assistant Examiners.*